United States Patent [19]

Smit

[11] 4,368,576
[45] Jan. 18, 1983

[54] METHOD OF FORMING AN END CONNECTION ARRANGEMENT ON A CO-AXIAL CABLE

[75] Inventor: Hermanus Smit, Eindhoven, Netherlands

[73] Assignee: U.S. Philips Corporation, New York, N.Y.

[21] Appl. No.: 202,807

[22] Filed: Oct. 31, 1980

[30] Foreign Application Priority Data

Nov. 16, 1979 [NL] Netherlands .................. 7908378

[51] Int. Cl.³ .................. H01B 13/20; H02G 15/02
[52] U.S. Cl. .................................................. 29/828
[58] Field of Search ............... 29/426.4, 828, 857, 29/861; 174/75 C, 88 C, 89; 81/9.5 R, 9.51

[56] References Cited

U.S. PATENT DOCUMENTS

| | | | |
|---|---|---|---|
| 3,044,333 | 7/1962 | Broske | 81/9.51 X |
| 3,153,358 | 10/1964 | Havens | 81/9.51 |
| 3,621,560 | 11/1971 | Le Bright | 29/828 |
| 3,757,278 | 9/1973 | Schumacher | 29/828 X |

FOREIGN PATENT DOCUMENTS

| | | | |
|---|---|---|---|
| 2156294 | 5/1973 | Fed. Rep. of Germany | 29/828 |
| 321891 | 2/1972 | U.S.S.R. | 29/828 |
| 650145 | 2/1979 | U.S.S.R. | 174/88 C |

*Primary Examiner*—Ervin M. Combs
*Attorney, Agent, or Firm*—David R. Treacy

[57] ABSTRACT

A method of forming an end suitable for electric coupling, on a coaxial cable having a flexible metal shield and a synthetic outer sheath. The outer sheath is cut circumferentially at a distance from the cable end, the end portion of the outer sheath is moved in the direction of the cable end so that the moved portion projects partly beyond the cable end, the end portion of the outer sheath is shortened, and then moved back while clamping against the metal shield, so that the metal shield is upset in the form of an umbrella and the insulated conductor is exposed.

5 Claims, 6 Drawing Figures

METHOD OF FORMING AN END CONNECTION ARRANGEMENT ON A CO-AXIAL CABLE

BACKGROUND OF THE INVENTION

The invention relates to a method of providing an end connection arrangement on a coaxial cable having an insulated central conductor, a flexible metal shield over the insulated control conductor and a synthetic resin outer sheath, and more particularly to such a method in which an end portion of the outer sheath is removed and the exposed end portion of the metal shield slid back so that the insulated central conductor becomes exposed.

According to the methods generally used so far, the end of the outer sheath cut loose is removed entirely, so that the position of the exposed end portion of the metal shield is no longer controlled by the outer sheath. The flexible metal shield usually consists of thin stranded or twisted metal wires. After removing the end portion of the outer sheath, the ends of the metal wires will flare slightly and entangling and unravelling of the wires of the metal shield will occur. This causes serious problems when the metal shield is slid back so that the end of the insulatedconductor becomes exposed. Furthermore, the electrical properties of the cable end upon connection to, for example, a connector are not optimum. Damping losses occur.

In the U.S. Pat. No. 3,153,358 a method is disclosed in which after removal of the outer sheath the exposed end portion of the shield is clamped, slid back over a given distance, clipped off and removed. The cable end obtained according to this known method and shown in FIG. 5 of this Patent has the disadvantage that the remaining free part of the metal shield, in particular when it consists of stranded metal wires, can easily unravel so that upon electric connection of the cable end problems occur and poor electric contacts are obtained.

SUMMARY OF THE INVENTION

The invention provides a method which mitigates the above disadvantages and can furthermore be carried out very rapidly and fully automatically. The resulting cable end which is suitable for connection gives electrically good contacts and no or no noteworthy damping losses occur.

In a method according to the invention at some distance from the cable end the outer sheath is cut through circumferentially, the end portion of the outer sheath is moved in the direction of the cable end so that the moved outer sheath projects partly beyond the cable end, the end portion of the outer sheath is then shortened by removing a distal end part of the portion and is moved back while clamping against the metal shield, the metal shield being upset in the form of an umbrella and the insulated conductor becoming exposed.

The end portion of the outer sheath may be rotated slightly during moving back, so that the grip on the metal shield is increased.

In a preferred embodiment the upset shield is pressed over the outer sheath either in a direction towards the cable end or in the opposite direction.

BRIEF DESCRIPTION OF THE DRAWING

The invention will be described in greater detail with reference to the drawing, in which.

DESCRIPTION OF THE PREFERRED EMBODIMENT

Figure 1:
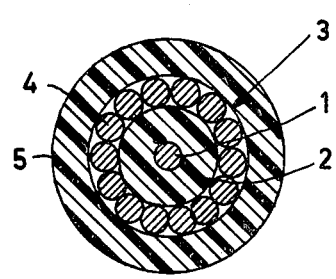
FIG. 1 is a cross-sectional view of a coaxial cable used in the method.

Reference numeral 1 in FIG. 1 denotes a central conductor, for example a metal wire or metal stranded wire. Conductor 1 is surrounded by a synthetic resin insulation layer 2 which in turn is surrounded by a flexible metal shield 3 of stranded metal wires 4. Shield 3 is covered with an outer sheath 5 of a synthetic resin, material for example polyethylene or PVC.

Figure 2:
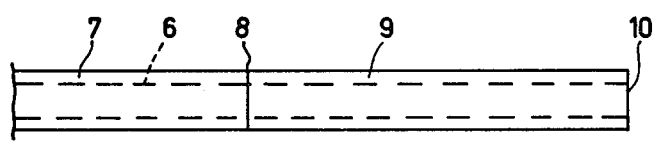
FIGS. 2-6 are elevations of the cable end during the various process steps of the method according to the invention.

FIG. 2 is a diagrammatic elevation of the end of the cable shown in FIG. 1. The broken lines 6 denote the outer circumference of shield 3 (FIG. 1). Outer sheath 7 is cut through circumferentially at the area 8 at a desired distance from the cable end, and end portion 9 is then moved from sheath 7 in the direction of the free cable end 10 in such manner that end portion 9 projects partly beyond the cable end 10. The situation shown in FIG. 3 is now reached.

Figure 3:
Figure 4:
Figure 5:
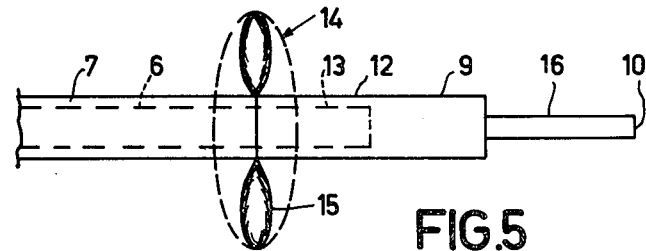
Figure 6:

In FIG. 3, as well as in FIGS. 4, 5 and 6, the same reference numerals are used as in FIG. 2.

During the above movement of end portion 9, the underlying shield 11 is exposed. The part of end portion 9 projecting beyond cable end 10 is shortened by clipping or cutting as is shown in FIG. 4, to remove the distal end part of the end portion. The shortened end portion 9 is then moved back in a direction opposite to the first movement, the part of end portion 9 denoted in FIG. 4 by reference numeral 12 being clamped or pressed on the underlying shield portion 13 (shield portion 13 is shown in broken lines).

As a result of the movement back of end portion under axial pressure, the exposed intermediate shield portion 11 is upset and the situation shown in FIG. 5 is obtained. The upset shield has the shape of an umbrella 14 consisting of wire loops 15 distributed regularly over the circumference. During the back-movement the insulated conductor 16 has become exposed.

The umbrella 14 of wire loops 15 is finally pressed on outer sheath 7 in a direction away from end 10, the situation shown in FIG. 6 being obtained.

What is claimed is:

1. A method of forming an end connection arrangement on a coaxial cable having a central conductor, a layer of insulation surrounding the conductor, a flexible metal shield around the insulation layer, and a synthetic material outer sheath, comprising
    cutting circumferentially through the outer sheath at a location spaced a first distance from the cable end, thereby defining an end portion of said sheath,
    moving said end portion of the sheath in a first direction toward said cable end a distance less than said first distance, whereby said end portion projects partly beyond the cable end,
    removing a distal end part of said end portion so as to shorten said end portion, and
    moving the shortened end portion in the direction opposite said first direction while clamping the end portion against the metal shield, so as to upset the shield and expose the insulated central conductor.

2. A method as claimed in claim 1, characterized in that said moving step moves the shortened end portion substantially back to its original position with respect to the central conductor.

3. A method as claimed in claim 2, characterized in that said removing step removes less than the entire projecting portion of said end portion, whereby upon completion of said moving step the sheath end portion extends beyond the end of the shield which is between the sheath and the insulation layer.

4. A method as claimed in claim 2, characterized in that moving the shortened end portion in said opposite direction upsets the flexible shield into an umbrella shape, and in that there is a following step of pressing the upset shield axially over the outer sheath.

5. A method as claimed in claim 4, wherein said shield is pressed axially in a direction away from the end of the cable.

* * * * *